United States Patent [19]
Heiser

[11] 3,748,857
[45] July 31, 1973

[54] HYDRAULIC MOTOR CONTROL ARRANGEMENT

[75] Inventor: Joachim Heiser, Bernhausen, Germany

[73] Assignee: Robert Bosch GmbH, Stuttgart, Germany

[22] Filed: Oct. 14, 1971

[21] Appl. No.: 189,183

[30] Foreign Application Priority Data
Oct. 16, 1970 Germany.............. P 20 50 882.1

[52] U.S. Cl.......................... 60/388, 60/445, 60/446
[51] Int. Cl............................................ F16h 39/46
[58] Field of Search................ 60/53 R, DIG. 2, 60/452, 388, 433, 445, 446; 91/37

[56] References Cited
UNITED STATES PATENTS

| | | | |
|---|---|---|---|
| 3,225,542 | 12/1965 | Hansen et al. | 60/53 R |
| 3,542,274 | 11/1970 | Miller | 60/53 X |
| 3,618,467 | 11/1971 | Faisandier | 60/53 |
| 3,650,108 | 3/1972 | Isaac | 60/53 |

Primary Examiner—Edgar W. Geoghegan
Attorney—Michael S. Striker

[57] ABSTRACT

A control arrangement for driving a hydraulic motor in which the input signal is derived from a pulse generator. A step motor converts the pulses from the pulse generator into mechanical position and positions correspondingly a servo valve. The output shaft of the hydraulic motor is also connected to the servo valve which compares the outputs of the step motor and hydraulic motor, and adjusts a hydraulic pump through a displacement cylinder so that the output of the hydraulic motor is substantially equal to the output of the step motor.

12 Claims, 3 Drawing Figures

INVENTOR
Joachim HEISER

By
his ATTORNEY 3,748,857

HYDRAULIC MOTOR CONTROL ARRANGEMENT

BACKGROUND OF THE INVENTION

The present invention relates to a hydraulic rotational motor drive controlled by a pulse generator. An input element in the form of electrical or pneumatic step motor controls the output hydraulic motor through a servo valve. Feedback is provided for compensating against deviations of synchronous operation of the output motor drive in relation to the input member.

For hydrostatic drives which are to assume a predetermined angular position as a function of time, it is possible to operate in conjunction with open or closed regulating circuits.

In closed regulating circuits, the equipment necessary for displacement or velocity measuring elements is relatively complex, and as a result the open regulating circuits are preferred. The input parameter for the open regulating circuit is applied through a pulse generator, as well as electrical counters. The conversion of the electrical signals into corresponding mechanical motion is accomplished through electrical step motors. The power capability of such step motors is, however, limited.

For controlling large power transmission, electrical step motors are provided with hydraulic torque amplifiers which are often referred to as electrohydraulic step motors. Such electrohydraulic motors have the disadvantage that the built-in torque amplifier with throttle regulation has a very low efficiency (theoretically less than 38 percent). Such arrangements can, therefore, be used only in conjunction with small power requirements.

SUMMARY OF THE INVENTION

Accordingly, it is an object of the present invention to provide an arrangement in which a programmable velocity-displacement function can be carried out with any desired power level and with low losses.

It is another object of the presention to provide an arrangement as set forth, which may be readily installed and economically maintained.

A still further object of the present invention is to provide an arrangement of the foregoing character which operates with substantially high reliability.

The objects of the present invention are achieved by providing a hydraulic motor within a closed regulating circuit which is fed from a displaceable and reversible hydraulic pump. An angular difference is measured between the output of the hydraulic motor and a step motor for displacing a hydraulic pump in accordance with the angular difference. The step motor receives pulse signals, by way of a signal translator from a pulse generator. The step motor positions a servo valve which has feedback and displaces a cylinder which, in turn, sets or positions a hydraulic pump serving to feed the hydraulic motor that drives the load.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
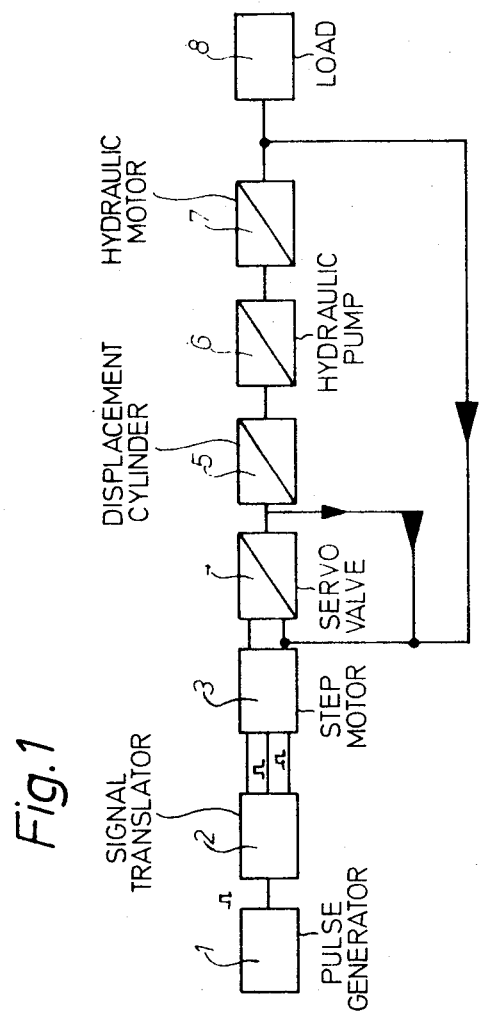
FIG. 1 is a block diagram and shows the hydraulic circuit for driving a load, in accordance with the present invention.
Figure 2:
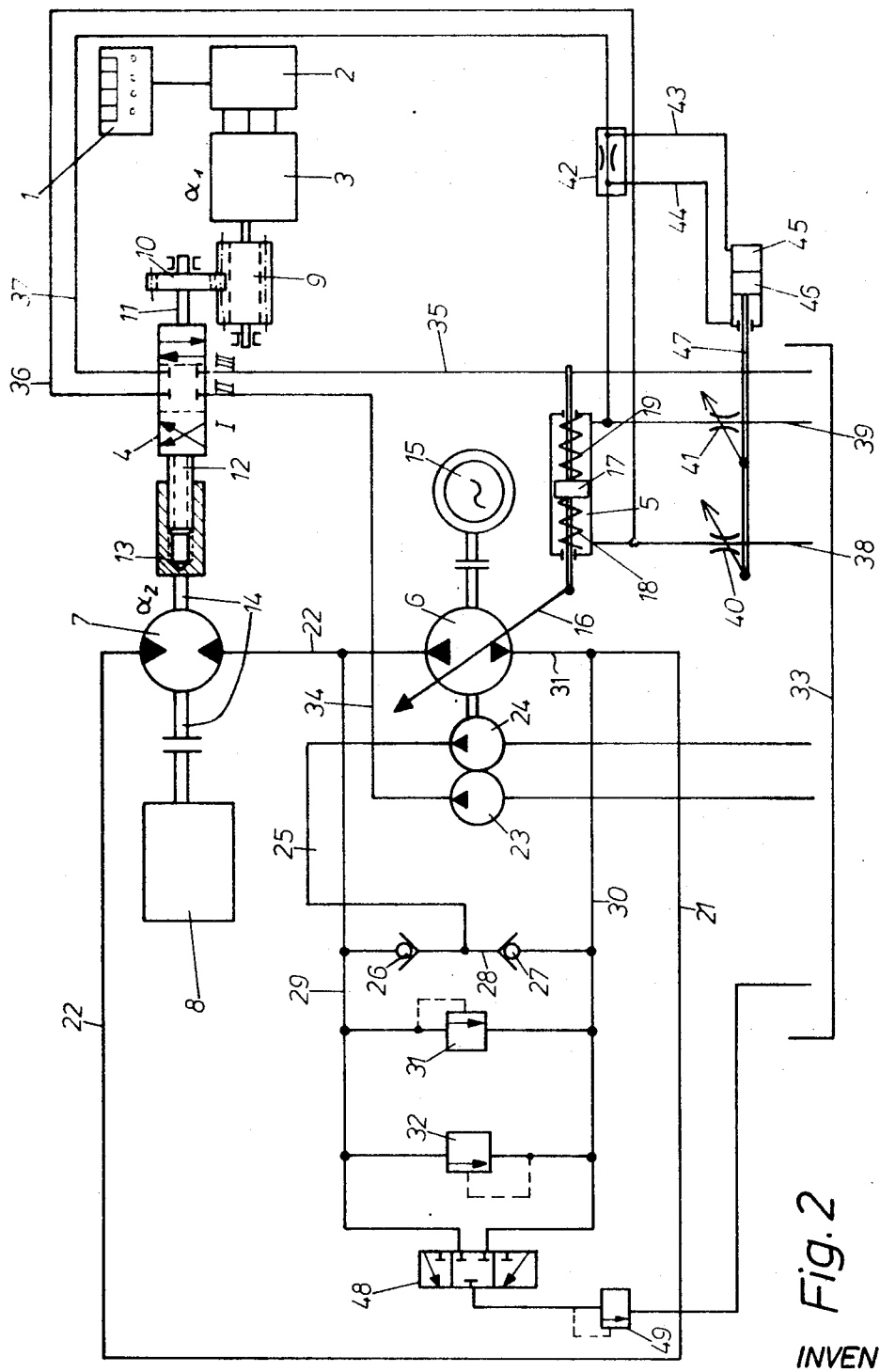
FIG. 2 is a schematic diagram of the arrangement of FIG. 1 and shows the hydraulic flow circuits.

Referring to the drawing and in particular to FIG. 1, the torque drive in accordance with the present invention consists of a control chain including a pulse generator 1, a signal translator 2, a step motor 3, a servo valve 4, a displacement cylinder 5, a hydraulic pump 6, a hydraulic motor 7, and a load 8 driven by the motor 7. The hydraulic pump 6 is of the reversible displacement type.

The pulse generator 1 is a programmed unit which may be constructed in the form of a pulse generator, a counter with forward and reverse counting characteristics, a magnetic storage unit, perforated tape storage, electromechanical pulse generator, or this device 1 can be made of a combination of the preceding apparatuses.

The pulses transmitted by the pulse generator 1 are applied to the step motor 3, through a signal translator 2 in the form of a combination of relays, for example. The step motor 3 drives a gear pinion 9 which meshes with a gear 10. The length of the pinion 9 along the longitudinal axis of the pinion is substantially greater than the width of the gear 10. Components 1–3 and 9 constitute selecting means in this embodiment with pinion 9 constituting a selecting member.

The gear 10 is fixed to a shaft 11 which, in turn, is connected rotatably with a servo valve 4. The latter becomes displaced axially, through rotation of the shaft 11. Such construction of a servo valve is well known in the art.

Secured to the servo valve 4, is a threaded rod 12 which is threadably received through a sleeve or bushing 13 having an internal thread. This sleeve or bushing 13 is secured to a shaft 14 of the hydraulic motor 7. The motor drives the load 8 through the shaft 14 coupling the load to the motor. As will be better appreciated below, components 10–13 comprise mechanical linkage means operative for moving the valve body of servo valve 4 in dependence upon the lack of rotational or angular correspondence between components 9 and 14.

The servo valve 4 is constructed as a closed-center valve with normal symmetrical center position and linear characteristics. Its control positions I, II, III can be continuously traversed.

The hydraulic pump 6 is driven by a motor 15, and its displacement element or adjusting means 16 is positioned by the displacement cylinder 5. The latter has a double-acting piston head 17 which operates against the action of springs 18 and 19. These springs operate on the piston head 17 so that they exert on this head forces in opposite directions.

Two lines 21 and 22 lead from the hydraulic pump 6 to the hydraulic motor 7 in a closed circuit. Two units 23 and 24 in the form of tandem pumps are connected to the hydraulic pump 6. This tandem pump operates synchronously with the hydraulic pump 6. The pump 24 forces fluid through the line 25 under substantially low pressure. The line 25 leads to check valves or relief valves 26 and 27 in the line 28. These check valves 27 and 26 also communicate with lines 29 and 30. The line 29 communicates with the line 22, whereas the line 30 enters the line 31. This arrangement is used in conventional hydraulic drives in closed circuits. Both of the lines 21, 22 or 29, 30 are secured from the point of view of safety through pressure-limiting valves 31, 32. Both pumps 23, 24 draw or suck pressurized fluid from a tank or reservoir 33, whereby the pump 24 serves as a make-up pump for the hydraulic pump 6.

A line 34 connects the pump 23 with the servo valve 4, and a line 35 leads from the servo valve 4 to the fluid reservoir or storage tank 33. Two lines 36 and 37 lead from the servo valve to opposite sides of the displacement cylinder 5. A flow-off line 38 leads from the line 36, and another flow-off line 39 leads from the line 37. Both flow-off lines 38 and 39 empty into the reservoir 33. A displaceable throttle 40 is connected within the flow-off line 38, and another displaceable throttle 41 is connected within the flow-off line 39.

A still further throttle 42 is connected within the line 37, but this throttle 42 is not adjustable, as are the throttles 40 and 41. The throttle 42 serves as a flow meter. Two lines 43 and 44 lead from the two sides of the throttle 42, to opposite sides of a hydraulic cylinder 45 which contains a piston head 46 movable within the cylinder with play. The piston head 46 has secured to it a piston rod 47 to which the displacement members of throttles 40 and 41 are secured.

This last-described arrangement forms a hydraulic network, whereas the construction of the two adjustable throttles 40 and 41, as well as the throttled transmission lines, form a bridge circuit at the control elements of the servo valve. The displacement cylinder 5 is connected within this bridge.

The lines 29 and 30 are, furthermore, connected to a flush gate or valve 48 which serves to connect to the low-pressure circuit of the reservoir. The flush gate 48 is connected to the reservoir 33 through a pressure retaining valve 49 which maintains a predetermined minimum pressure within the circuit 29, 30. The hydraulic arrangement, with the exception of the valve 4, corresponds to a conventional hydrostatic arrangement with closed circuit.

The step motor 3 receives the desired input angle $\alpha_1$ by the pulse generator 1 through the translator 2. The step motor then executes a number of rotations corresponding to the desired input value. The step motor, at the same time, may execute fractional parts of revolutions in order to correspond to the desired input value. The desired input value is then transmitted to the servo valve, through the gear pinion 9 and gear 10 in mesh therewith. If the servo valve is equipped with a longitudinal sliding member, then this member is axially displaced in accordance with the desired value or desired input. Pressurized fluid flows the pressure source 23 through the servo valve 4 and into lines 36, 37, and toward the displacement cylinder 5. From there, the fluid is returned to the reservoir 33 through the flow-off lines 38 and 39. Depending upon the displacement or position of the servo valve, a pressure difference in the lines 36 and 37, serves to displace the piston head 17 within the displacement cylinder. This piston head is displaced until the resultant forces applied to the head by the springs and the pressure difference in the lines 36 and 37, are in balance. Since each position of the servo valve 4 corresponds to a predetermined position of the piston head 17, a proportional relationship prevails relative to the displacement system. The piston head 17 displaces the adjustable member 16 of the hydraulic pump 6 in a manner so that the hydraulic motor 7 receives a flow rate corresponding to the rotational or angular motion of the step motor 3. As a result of transmission errors and, for example, adhesion losses, friction, etc., the step motor is displaced by the output value or angle $\alpha_2$.

Since the setting of the adjustable member 16 of the hydraulic pump is proportional to the position of the servo valve 4, the angular position of the hydraulic motor relative to the step motor is dependent only on velocity, or constant load. This corresponds then to dependency on the stepping frequency of the pulse generator. Thus, the difference in angular positions of the hydraulic motor and the step motor is dependent upon the pulse frequency of the signal transmitted by the pulse generator 1.

The error corresponding to the difference in the angular positions of $\alpha_1$ and $\alpha_2$ becomes compensated through the servo valve 4, the gears 9, 10, and the threaded device 12, 13, as a result of the feedback compensation. The input parameters of the servo valve 4 are, thereby, always the rotational angle $\alpha_1$ of the step motor 3, and the rotational angle $\alpha_2$ of the hydraulic motor 7. With the feedback provided in the arrangement, the regulating system is simultaneously stabilized.

In the event that further stabilization of the system is required, a second feedback arrangement is provided which consists of the adjustable throttles 40, 41 and the fixed throttle 42. By flowing through the line 37, the fluid causes a pressure difference to prevail across the throttle 42, and this pressure difference is transmitted through lines 43, 44 to the piston head 45. The cylinder 45 sets or adjusts the two throttles 40, 41 which influence the displacement velocity of the piston head 46 and thereby result in damping effects.

With the arrangement in accordance with the present invention, it is possible to provide a programmable velocity-time function under simultaneous torque amplification through means of a hydraulic drive. With this arrangement, it is also possible to achieve large power transmission with high precision. The present invention is particularly adaptable for program-controlled systems such as machine tools, typography setting machines, plastic die injection machines, etc.

Figure 3:
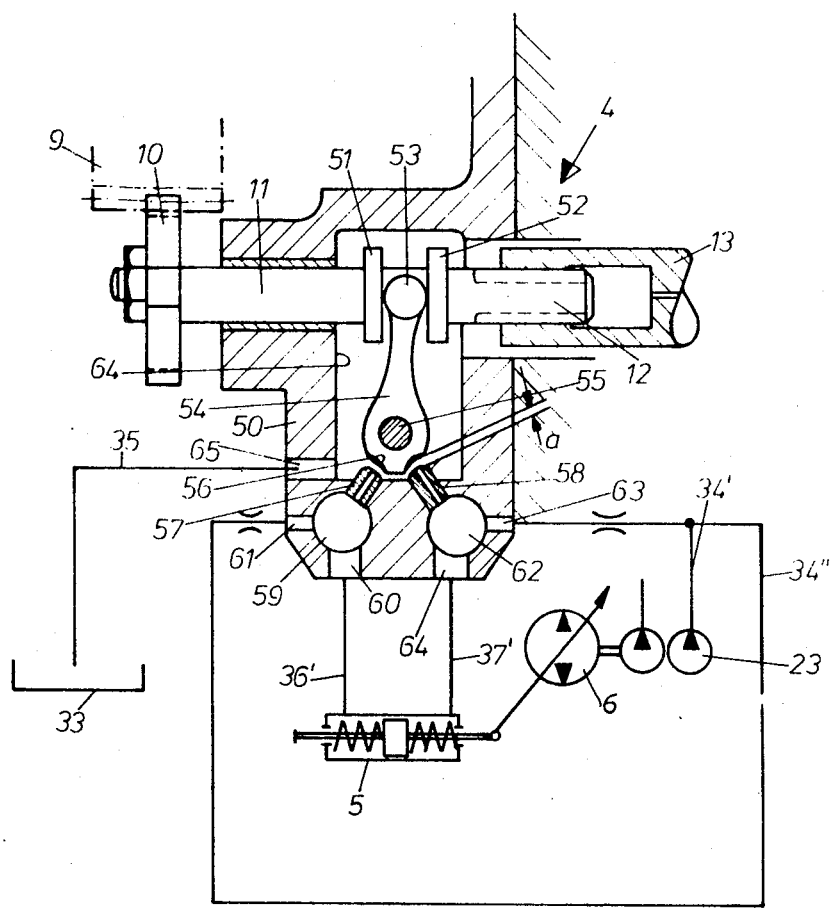
FIG. 3 is a sectional view of the servo valve used in conjunction with the arrangement of FIG. 1.

FIG. 3 shows one possible embodiment for the servo valve 4. In this embodiment, a housing 50 carries a shaft 11 for retaining the gear 10 thereon. The shaft 11 has two shoulders 51 and 52 between which a head 53 of a lever 54 resides. The head 53 moves within the two shoulders 51 and 52 without play. The lever 54 is rotatably mounted on a pivot 55 fixed to the housing. The lever 54 serves as the control member for the servo valve. The valve has a control surface 65 which lies opposite to nozzles 57, 58. These nozzles are oriented along axes which intersect and form thereby an angle. The nozzle 57 ends in a pressure space or chamber 59 which communicates with two bores 60 and 61. A line 36' leads from the bore 60 to the displacement cylinder 5. The nozzle 58 has one end within a pressure chamber 62 which, in turn, communicates with two bores 63 and 64. A line 37' leads from the bore 64 to the displacement cylinder. The bores 61 and 63 are connected with the lines 34', 34''. These latter two lines are connected with the pump 23. A recess 64 within the housing for the lever communicates with the reservoir, by way of a bore 65 and the line 35.

Depending upon the rotational angles $\alpha_1$, $\alpha_2$, and thereby the position of the control surface 56 at the lever 50, the space between the latter and the nozzle is larger or smaller. As a result, a greater flow rate will prevail in one nozzle than in the other nozzle, and the displacement or servo cylinder thereby takes or assumes a corresponding position.

It will be understood that each of the elements described above, or two or more together, may also find a useful application in other types of hydraulic motor drives differing from the types described above.

While the invention has been illustrated and described as embodied in a hydraulic motor drive, it is not intended to be limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended

1. A hydraulic servomechanism comprising, in combination, hydraulic motor means having a rotary output member capable of assuming any of a plurality of angular orientations; reversible and adjustable hydraulic pump means connected to said hydraulic motor means and operative for furnishing hydraulic fluid to said motor means for changing the angular orientation of said output member in either rotational direction thereof, said hydraulic pump means including movable adjusting means operative for varying the flow of fluid to said motor means; selecting means for selecting an angular orientation for said rotary output member and including a movable selecting member whose position is indicative of the selected angular orientation; and hydraulic control means operative for moving said adjusting means in a sense reducing substantially to zero any discrepancy between the angular orientation of said output member and said selected orientation, said control means comprising a servo valve including a valve housing and a valve body movable therein for changing the position of said adjusting means by varying the flow of fluid in said hydraulic control means, and mechanical linkage means operative for mechanically coupling said servo valve to said rotary output member and to said movable selecting member in such a manner as to constrain said valve body to assume a position dependent upon the difference between the orientation of said output member and the orientation indicated by the position of said selecting member.

2. A servomechanism as defined in claim 1, wherein said pump means includes fluid conduits so connected to said motor means as to form a closed hydraulic circuit including said pump means and said motor means.

3. A servomechanism as defined in claim 2, wherein said selecting means comprises a step motor whose output shaft controls the position of said selecting member.

4. A servomechanism as defined in claim 1, wherein said hydraulic control means further comprises an hydraulic cylinder and a piston slidable therein and mechanically coupled to said adjusting means and defining a chamber in said cylinder having an inlet, and wherein said servo valve has an outlet for hydraulic fluid connected to said inlet and is so contructed as to deliver fluid into said chamber at a pressure dependent upon the position of said valve body.

5. A servomechanism as defined in claim 1, wherein said hydraulic control means further comprises an hydraulic cylinder and a piston slidable therein and mechanically coupled to said adjusting means and dividing the interior of said cylinder into two chambers each having a respective inlet for hydraulic fluid, and wherein said servo valve has two outlets for hydraulic fluid each connected to one of said inlets and is so constructed as to deliver fluid into said chambers at unequal pressures to move said piston in dependence upon the position of said valve body.

6. A servomechanism as defined in claim 5, wherein said hydraulic control means further includes auxiliary pump means supplying fluid under pressure to said servo valve.

7. A servomechanism as defined in claim 6, wherein each of said chambers furthermore has an outlet and an adjustable outlet valve controlling the outlet, and wherein one of the outlets of said servo valve is connected to one of the inlets of said chambers via a fixed throttle, said control means further including an additional cylinder and piston arrangement including an additional hydraulic cylinder and a piston slidable therein and mechanically coupled to said outlet valves for adjusting the same and dividing the interior of said additional cylinder into two chambers each having an inlet, a fluid conduit connected to one of said two last-mentioned inlets and also to one side of said fixed throttle, and another fluid conduit connected to the other of said two last-mentioned inlets and also to the other side of said fixed throttle, for furnishing fluid at different pressures into the chambers of said additional cylinder.

8. A servomechanism as defined in claim 5, wherein said servo valve comprises two inlet nozzles and wherein said valve body is pivotably mounted in operative proximity to said nozzles for movement through a range of positions changing the outflow of fluid from one of said nozzles relative to the outflow of fluid from the other of said nozzles, and wherein said control means further includes auxiliary pump means for supplying hydraulic fluid into said servo valve to be discharged from said nozzles.

9. A servomechanism as defined in claim 8, wherein each of said nozzles is associated with one of said outlets of said servo valve for varying the relative pressures of fluid flowing out from said outlets of said servo valve in dependence upon the position of said valve body.

10. A hydraulic motor driving arrangement comprising, in combination, pulse generator means for providing a source of input pulses; step-motor means connected to said pulse generator means and positioned as a function of said input pulses; servo valve means having a first input connected to the output of said step motor means; adjustable and reversible hydraulic pump means connected to said servo valve and adjusted by said servo valve means; hydraulic motor means connected to said pump means and supplied with hydraulic fluid in closed circuit by said pump means; means for connecting the output of said hydraulic motor means with a second input of said servo valve means, said servo valve means comparing the output of said step motor means with the output of said hydraulic motor means and adjusting said pump means as a function of the difference between said output of said hydraulic motor means and said output of said step motor means, and further including displacement cylinder means connected between said hydraulic means and said servo valve means for positioning and adjusting said pump means in response to the output of said servo valve means, said output of said servo valve means being the difference between the output of said hydraulic motor means and the output of said step motor means, and further including auxiliary pump means connected to said servo valve means; and two flow control lines connecting said servo valve means to said displacement cylinder means and further including fixed throttle means connected in one of said flow control lines; further displacement cylinder means connected to said fixed throttle means and responding to the pressure difference across said fixed throttle means; two adjustable throttle means adjusted by said further displacement cylinder means in response to said pressure difference; and flow-off line means connected to said adjustable throttle means.

11. A hydraulic motor driving arrangement comprising, in combination, pulse generator means for providing a source of input pulses; step-motor means connected to said pulse generator means and positioned as a function of said input pulses; servo valve means having a first input connected to the output of said step motor means; adjustable and reversible hydraulic pump means connected to said servo valve and adjusted by said servo valve means; hydraulic motor means connected to said pump means and supplied with hydraulic fluid in closed circuit by said pump means; means for connecting the output of said hydraulic motor means with a second input of said servo valve means, said servo valve means comparing the output of said step motor means with the output of said hydraulic motor means and adjusting said pump means as a function of the difference between said output of said hydraulic motor means and said output of said step motor means, and further including displacement cylinder means connected between said hydraulic means and said servo valve means for positioning and adjusting said pump means in response to the output of said servo valve means, said output of said servo valve means being the difference between the output of said hydraulic motor means and the output of said step motor means, and further including auxiliary pump means connected to said servo valve means; and two flow control lines connecting said servo valve means to said displacement cylinder means and wherein said servo valve means comprises a swivellable lever pivoted about a fixed axis; means for positioning said lever as a function of the positions of said step motor means and said hydraulic motor means; and two nozzles controlled by said lever so that fluid from said auxiliary pump passes through said nozzles in a predetermined manner.

12. An arrangement as defined in claim 11, including pressure lines controlled by said nozzles and communicating with said first-mentioned displacement cylinder.

* * * * *